United States Patent [19]

Wada et al.

[11] 4,381,245

[45] Apr. 26, 1983

[54] SUPERCOOLING INHIBITOR AND PROCESS FOR PREPARING THE SAME

[75] Inventors: Takahiro Wada; Shoichi Ishihara, both of Katano; Ryoichi Yamamoto, Neyagawa, all of Japan

[73] Assignee: Matsushita Electric Industrial Co., Ltd., Osaka, Japan

[21] Appl. No.: 315,456

[22] Filed: Oct. 27, 1981

[30] Foreign Application Priority Data

Oct. 27, 1980 [JP] Japan ............................... 55-150517
Mar. 17, 1981 [JP] Japan ................................. 56-38969

[51] Int. Cl.³ ........................ C09K 3/18; C01B 25/42
[52] U.S. Cl. ...................................... 252/70; 423/305
[58] Field of Search ........................... 252/70; 423/305

[56] References Cited

FOREIGN PATENT DOCUMENTS 2448739 2/1976 Fed. Rep. of Germany .
5016035 4/1980 Japan .

*Primary Examiner*—John E. Kittle
*Assistant Examiner*—Robert A. Wax
*Attorney, Agent, or Firm*—Stevens, Davis, Miller & Mosher

[57] ABSTRACT

A supercooling inhibitor comprising a supercooling inhibitor base having all or part of its surface coated with sodium acetate trihydrate. The supercooling inhibitor base comprises one or more members selected from the group consisting of sodium pyrophosphate ($Na_4P_2O_7$), trisodium monohydrogen pyrophosphate ($Na_3HP_2O_7$), disodium dihydrogen pyrophosphate ($Na_2H_2P_2O_7$), monosodium trihydrogen pyrophosphate ($NaH_3P_2O_7$), sodium pyrophosphate decahydrate ($Na_4P_2O_7.10H_2O$), and disodium dihydrogen pyrophosphate hexahydrate ($Na_2H_2P_2O_7.6H_2O$). The supercooling inhibitor of the present invention is useful for inhibiting the supercooling of sodium acetate trihydrate which is used as a heat regenerating material utilizing heat of fusion.

3 Claims, No Drawings

SUPERCOOLING INHIBITOR AND PROCESS FOR PREPARING THE SAME

This invention relates to supercooling inhibitor for use in heat regenerating materials utilizing heat of fusion (hereinafter, "heat regenerating material" is referred to simply as regenerating material).

When a hydrate such as, for example, $Na_2SO_4.10H_2O$ is used as a regenerating material, its smooth melting and freezing are necessary in order to effectively take out its latent heat during solidification of the molten hydrate. For this purpose, a small amount of a supercooling inhibitor base is usually added to the regenerating material. The supercooling inhibitor base herein referred to is a substance which does not dissolve completely in the regenerating material and exhibits its heterogeneous nucleating action the moment the molten regenerating material is cooled the slightest degree below its melting point, and produces minute solid fragments of the regenerating material on the surface of nuclei, thereby promoting the solidification of the regenerating material.

A supercooling inhibitor base, though added to a regenerating material, utilizing heat of fusion, which is liable to be supercooled, often does not satisfactorily function at first because it is not yet well compatible with the regenerating material. It is known that the regenerating material containing such a supercooling inhibitor base, once solidified in some way, separates out its solid phases on the surface of the supercooling inhibitor base, becomes well compatible with it and capable of repeating thereafter stable melting and freezing. For example, a regenerating mixture composed of $NaCH_3COO.3H_2O$ as a regenerating material and $Na_4P_2O_7.10H_2O$ added as a supercooling inhibitor base is frequently cooled to room temperature without breaking its supercooling state at the first solidification. The mixture of $NaCH_2COO.3H_2O$ and $Na_4P_2O_7.10H_2O$ in the supercooling state, once solidified in some way, can also repeat stable melting and freezing thereafter.

For this reason, when actually using a regenerating material and a supercooling inhibitor base in a regenerating tank, it is necessary to heat a mixture thereof once to a temperature where the regenerating material melts and cool it again to make sure whether or not it breaks its supercooling state successfuly, and if not, the supercooling state must be broken in some way to solidify the mixture. Such operations, requiring much time and labor, are undesirable from a practical point of view.

Recently, there has been an increased demand for the arbitrary controlling of the solidification of regenerating material when it is used for air conditioners or other devices. For this purpose, utilization of single crystals as a supercooling inhibitor base has been offered. However, this supercooling inhibiting function is usually inferior to the function of a finely powdered inhibitor base because the single crystals do not have as many sites on their surface, such as dislocations, which will cause heterogeneous nucleation, and because the surface area of the single crystals is limited.

An object of the present invention is to provide a supercooling inhibitor. More specifically, an object is to provide a supercooling inhibitor by coating at least part of the surface of a supercooling inhibitor base with a regenerating material utilizing heat of fusion, whereby the above-mentioned difficulties are solved. That is, a regenerating material containing such a supercooling inhibitor will positively freeze from the beginning, causing almost no supercooling. Another object of the present invention is to provide a supercooling inhibitor which enables the freezing behavior of a regenerating material to be controlled.

The regenerating materials for which the supercooling inhibitor of this invention is especially useful include inorganic hydrates which have large values of heat of fusion but need the aid of a suitable supercooling inhibitor because of their liability to be supercooled.

For preparing such a supercooling inhibitor, the present invention adopts the following processes: (i) a mixture of a regenerating material and a supercooling inhibitor base is heated to the melting point of said regenerating material or more, and then said supercooling inhibitor base is withdrawn from the molten liquid and cooled to freeze and adhere the regenerating material on the surface of said inhibitor base; or (ii) a mixture of a regenerating material and a supercooling inhibitor base is heated to the melting point of said regenerating material or more and cooled as it is, to freeze and adhere said regenerating material to the surface of said inhibitor base.

The present invention is illustrated by the following reference examples where $NaCH_3COO.3H_2O$ (m.p. 58° C.) as a regenerating material and $Na_4P_2O_7.10H_2O$ as a supercooling inhibitor base are used:

REFERENCE EXAMPLE 1

A glass vessel containing 100 parts by weight of $NaCH_3COO.3H_2O$ was heated to 80° C. in a water bath to melt the content entirely. Then, 50 parts by weight of $Na_4P_2O_7.10H_2O$ crystals was added and mixed. The crystals of $Na_4P_2O_7.10H_2O$ settled on the bottom of the vessel. Then, the crystals of $Na_4P_2O_7.10H_2O$ were taken up with a suitable net. At this time, there was molten $NaCH_3COO.3H_2O$ adhering on the crystal surface. On standing for a short time at room temperature, the $NaCH_3COO.3H_2O$ on the surface was solidified, and a supercooling inhibitor was obtained which comprises $Na_4P_2O_7.10H_2O$ crystals coated with $NaCH_3COO.3H_2O$ crystals.

REFERENCE EXAMPLE 2

A mixture of 100 parts by weight of $NaCH_3COO.3H_2O$ and 60 parts by weight of $Na_4P_2O_7.10H_2O$ was heated to 70° C. in a vessel to melt the $NaCH_3COO.3H_2O$ entirely, the $Na_4P_2O_7.10H_2O$ crystals settled underneath the molten $NaCH_3COO.3H_2O$. The content was cooled to solidify the $NaCH_3COO.3H_2O$, ad when it was supercooled and the supercooling state could not be broken, seed crystals of $NaCH_3COO.3H_2O$ were added to solidify the $NaCH_3COO.3H_2O$. Thus, supercooling inhibitor blocks of $Na_4P_2O_7.10H_2O$ crystals coated with $NaCH_3COO.3H_2O$ were obtained.

Now, the action of the supercooling inhibitor of the present invention is illustrated by referring to a case where $NaCH_3COO.3H_2O$ and $Na_4P_2O_7.10H_2O$ are used as a regenerating material and as a supercooling inhibitor base, respectively.

A mixture of 100 parts by weight of $NaCH_3COO.3H_2O$ with 0.1 part by weight of the supercooling inhibitor obtained by the preparation process described above was heated up to 70° C. to melt the $NaCH_3COO.3H_2O$. In this melting, the $NaCH_3COO.3H_2O$ covering the cores of supercooling inhibitor particles is considered, as a matter of course, to melt along with the surrounding $NaCH_3COO.3H_2O$. The regenerating material, when cooled back to a temperature below its melting point, froze smoothly without being supercooled. This smooth freezing was conceivably caused by the heterogeneous nucleating action of the surface of the $Na_4P_2O_7.10H_2O$ crystals. This surface, after having experienced the coating with $NaCH_3COO.3H_2O$ crystal deposits, has a much better supercooling inhibitive function than does the surface of $Na_4P_2O_7.10H_2O$ crystals which has never experienced such coating. The cause of this excellent supercooling inhibitive function, although not clear at present, is assumed as follows: on the surface of $Na_4P_2O_7.10H_2O$ crystals once coated with $NaCH_3COO.3H_2O$ crystal deposits, some vestiges will remain after melting of said deposits and will effectively act to form heterogeneous nuclei.

Besides ensuring the inhibition of supercooling from the beginning by using the usual polycrystalline supercooling inhibitor base, the present invention has another characteristic, that is, it also permits similar effective inhibition of supercooling by using single crystals as a supercooling inhibitor base which are inferior in supercooling inhibiting function, and controlling the freezing behavior of regenerating materials by chosing the setting position of the supercooling inhibitor in a regenerating apparatus.

Similar effects were observed when $Na_4P_2O_7$, $Na_3HP_2O_7$, $Na_2H_2P_2O_7$, $NaH_3P_2O_7$, and $Na_2H_2P_2O_7.6H_2O$ are used, as a supercooling inhibitor base, in combination with $NaCH_3COO.3H_2O$ as a regenerating material.

The supercooling inhibitors of the present invention will be illustrated in more detail by the following examples; however, the present invention will not be limited to these examples.

EXAMPLE 1

$NaCH_3COO.3H_2O$ (100 parts by weight) was heated to 70° C. to melt it completely. Therein, $Na_4P_2O_7.10H_2O$ single crystals (2 parts by weight) were placed for 1 minute, then taken out, and allowed to stand at room temperature. Freezing of the $NaCH_3COO.3H_2O$ adhering to the surface of $Na_4P_2O_7.10H_2O$ single crystals gave a supercooling inhibitor. A mixture of $NaCH_3COO.3H_2O$ (1000 parts by weight) with the supercooling inhibitor (2.5 parts by weight) thus obtained was prepared, and its melting and freezing behavior was observed by repeating heating and cooling. Crystallization of the $NaCH_3COO.3H_2O$ started from the supercooling inhibitor surface and was smoothly carried out, causing almost no supercooling from the first cooling for solidification. Thus, a marked supercooling inhibiting effect was observed. In addition, it was confirmed that the freezing behavior of the regenerating material can be adequately controlled by choosing the setting position of the supercooling inhibitor in a regenerator.

EXAMPLE 2

$NaCH_3COO.3H_2O$ (100 parts by weight) and $Na_4P_2O_7.10H_2O$ (40 parts by weight) were heated to 75° C. in a vessel to melt the $NaCH_3COO.3H_2O$ entirely. The mixture was cooled to solidify $NaCH_3COO.3H_2O$ and a mass composed of the two components was obtained. Of the solidified mass, a portion which had been laid in the bottom of the vessel was composed essentially of $Na_4P_2O_7.10H_2O$, and 1.5 parts by weight of this portion was cut off and mixed with 100 parts by weight of $NaCH_3COO.3H_2O$ to use the mixture as a regenerating material.

This regenerating material showed smooth and stable melting and freezing from the beginning in repeated heating and cooling tests, i.e., it functioned satisfactorily as a regenerating material, whereby the supercooling inhibitor prepared in this example was confirmed as an excellent one.

EXAMPLE 3

A 50% by weight of concentration of aqueous $CH_2COONa$ solution (100 parts by weight) and $Na_4P_2O_7.10H_2O$ (40 parts by weight) were heated to 65° C. in a vessel to melt $NaCH_3COO.3H_2O$ completely. The mixture was then cooled to solidify the $NaCH_3COO.3H_2O$, and a mass composed of $Na_4P_2O_7.10H_2O$, $NaCH_3COO.3H_2O$, and so on was obtained. A bottom portion (1.5 parts by weight) of the solidified mass was cut off and added as a supercooling inhibitor to $NaCH_3COO.3H_2O$ (100 parts by weight).

This regenerating material showed smooth and stable melting and freezing from the beginning in repeated heating and cooling tests, i.e., it functioned satisfactorily as a regenerating material, whereby the supercooling inhibitor prepared in this example was confirmed as an excellent one.

EXAMPLE 4

$NaCH_3COO.3H_2O$ (100 parts by weight) and $Na_3HP_2O_7$ (40 parts by weight) were heated to 85° C. in a vessel to melt the $NaCH_3COO.3H_2O$ completely. The mixture was cooled to solidify the $NaCH_3COO.3H_2O$, and a supercooling inhibitor comprising $Na_3HP_2O_7$ coated with $NaCH_3COO.3H_2O$ crystals was obtained. Of this supercooling inhibitor, a portion (3 parts by weight) which had been laid in the bottom of the vessel was mixed with an aqueous solution (100 parts by weight) containing 58% by weight of $CH_3COONa$ to use the mixture as a regenerating material.

This regenerating material showed smooth and stable melting and freezing from the beginning in repeated heating and cooling tests, i.e., it functioned satisfactorily as a regenerating material, whereby the supercooling inhibitor prepared in this example was confirmed as an excellent one.

EXAMPLE 5

$NaCH_3COO.3H_2O$ (100 parts by weight) and $Na_2H_2P_2O_7$ (40 parts by weight) were heated to 65° C. in a vessel to melt the $NaCH_3COO.3H_2O$ completely. The mixture was cooled to solidify the $NaCH_3COO.3H_2O$, and a supercooling inhibitor comprising $Na_2H_2P_2O_7$ coated with $NaCH_3COO.3H_2O$ crystals was obtained. Of this supercooling inhibitor, a portion (3 parts by weight) which had been laid in the bottom of the vessel was mixed with an aqueous solution (100 parts by weight) containing 55% by weight of $NaCH_3COO.3H_2O$ to use the mixture as a regenerating material.

This regenerating material showed smooth and stable melting and freezing from the beginning in repeated heating and cooling tests, i.e., it functioned satisfactorily as a regenerating material, whereby the supercooling inhibitor of this example is confirmed as an excellent one.

EXAMPLE 6

$NaCH_3COO.3H_2O$ (100 parts by weight) and $Na_2H_2P_2O_7.6H_2O$ (60 parts by weight) were heated to 70° C. in a vessel to melt the $NaCH_3COO.3H_2O$ completely. The mixture was then cooled to solidify the NaCH- $_3$COO.3H$_2$O, giving a supercooling inhibitor comprising Na$_2$H$_2$P$_2$O$_7$.6H$_2$O coated with NaCH$_3$COO.3H$_2$O crystals. Of this supercooling inhibitor, a portion (3 parts by weight) which had been laid in the bottom of the vessel was mixed with an aqueous solution (100 parts by weight) containing 58% by weight of CH$_3$COONa to use the mixture as a regenerating material.

This regenerating material showed smooth and stable melting and freezing from the beginning in repeated heating and cooling tests, i.e., it functioned satisfactorily as a regenerating material, whereby the supercooling inhibitor of this example was confirmed as an excellent one.

EXAMPLE 7

NaCH$_3$COO.3H$_2$O (100 parts by weight) and NaH$_3$P$_2$O$_7$ (40 parts by weight) were heated to 65° C. in a vessel to melt the NaCH$_3$COO.3H$_2$O completely. The mixture was cooled to solidify the NaCH$_3$COO.3H$_2$O, giving a supercooling inhibitor comprising NaH$_3$P$_2$O$_7$ coated with NaCH$_3$COO.3H$_2$O crystals. Of this supercooling inhibitor, a portion (5 parts by weight) which had been laid in the bottom of the vessel was mixed with an aqueous solution (100 parts by weight) containing 60 parts by weight of CH$_3$COONa to use the mixture as a regenerating material.

This regenerating material showed smooth and stable melting and freezing from the beginning in repeated heating and cooling tests, i.e., functioned satisfactorily as a regenerating material, whereby the supercooling inhibitor of this example was confirmed as an excellent one.

As illustrated above, the supercooling inhibitors of the present invention have the following characteristics: they secure the inhibition of supercooling for a given heat regenerating material from the first cooling for solidification and allow thereafter stable freezing of the regenerating material causing practically no supercooling, and in addition, even when their base comprises single crystals, of which supercooling inhibitive function has so far been considered to be inferior, they are comparable or superior to those of fine powder base in the function, thereby making it possible to control the freezing behavior of regenerating materials. It is a matter of course that the suitable combination of regenerating material with supercooling inhibitor base in the present invention is not limited to the foregoing examples.

The supercooling inhibitors of the present invention have a structure built up of a supercooling inhibitor base and a regenerating material covering the inhibitor base surface, and there is no particular restriction on kinds of these two components. Accordingly, the present invention can be applied for inhibiting the supercooling of regenerating materials of latent heat type over a wide range of operating temperature by using various kinds of regenerating material and supercooling inhibitor base. Further, because of their easy preparation process, the supercooling inhibitors of the present invention have a great influence on the practical application of systems utilizing regenerating materials of the latent heat type.

What is claimed is:

1. A supercooling inhibitor comprising:
   a supercooling inhibitor base comprising at least one member selected from the group consisting of sodium pyrophosphate (Na$_4$P$_2$O$_7$), trisodium monohydrogen phosphate (Na$_3$HP$_2$O$_7$), disodium dihydrogen phosphate (Na$_2$H$_2$P$_2$O$_7$), monosodium trihydrogen pyrophosphate (NaH$_3$P$_2$O$_7$), sodium pyrophosphate decahydrate (Na$_4$P$_2$O$_7$.10H$_2$O) and disodium dihydrogen pyrophosphate hexahydrate (Na$_2$H$_2$P$_2$O$_7$.6H$_2$O); and
   a heat regenerating material utilizing heat of fusion comprising sodium acetate trihydrate (CH$_3$COONa.3H$_2$O), the surface of said supercooling inhibitor base being at least partially coated with said heat regenerating material.

2. A process for preparing a supercooling inhibitor, comprising the steps of:
   (a) heating a mixture of sodium acetate trihydrate (CH$_3$COONa.3H$_2$O) and a supercooling inhibitor base comprising one or more members selected from the group consisting of sodium pyrophosphate (Na$_4$P$_2$O$_7$), trisodium monohydrogen pyrophosphate (Na$_3$HP$_2$O$_7$), disodium dihydrogen pyrophosphate (Na$_2$H$_2$P$_2$O$_7$), monosodium trihydrogen pyrophosphate (NaH$_3$P$_2$O$_7$), sodium pyrophosphate decahydrate (Na$_4$P$_2$O$_7$.10H$_2$O) and disodium dihydrogen pyrophosphate hexahydrate (Na$_2$H$_2$P$_2$O$_7$.6H$_2$O), to at least the melting point of said sodium acetate trihydrate;
   (b) withdrawing a mass comprising said supercooling inhibitor base and said sodium acetate trihydrate out of the molten sodium acetate trihydrate; and
   (c) cooling the withdrawn mass so that the sodium acetate trihydrate freezes and adheres to the surface of said supercooling inhibitor base.

3. A process for preparing a supercooling inhibitor, comprising the steps of:
   (a) heating a mixture of sodium acetate trihydrate (CH$_3$COONa.3H$_2$O) and a supercooling inhibitor base comprising one or more members selected from the group consisting of sodium pyrophosphate (Na$_4$P$_2$O$_7$), trisodium monohydrogen pyrophosphate (Na$_3$HP$_2$O$_7$), disodium dihydrogen pyrophosphate (Na$_2$H$_2$P$_2$O$_7$), monosodium trihydrogen pyrophosphate (NaH$_3$P$_2$O$_7$), sodium pyrophosphate decahydrate (Na$_4$P$_2$O$_7$.10H$_2$O) and disodium dihydrogen pyrophosphate hexahydrate (Na$_2$H$_2$P$_2$O$_7$.6H$_2$O), to at least the melting point of said sodium acetate trihydrate; and
   (b) cooling said mixture, so that the sodium acetate trihydrate freezes and adheres to the surface of said supercooling inhibitor base.

\* \* \* \* \*